United States Patent [19]
van der Lely

[11] Patent Number: 5,816,190
[45] Date of Patent: Oct. 6, 1998

[54] APPARATUS FOR MILKING ANIMALS

[76] Inventor: Cornelis van der Lely, 7 Brüschenrain, CH-6300 Zug, Switzerland

[21] Appl. No.: 736,285

[22] Filed: Oct. 24, 1996

Related U.S. Application Data

[63] Continuation of PCT/NL96/00088, Feb. 22, 1996, published as WO96/25846, Aug. 29, 1996.

[30] Foreign Application Priority Data

| Oct. 4, 1995 | [NL] | Netherlands | 9500363 |
| Feb. 22, 1996 | [NL] | Netherlands | 1001336 |

[51] Int. Cl.$^6$ ........................................................ A01J 5/00
[52] U.S. Cl. ........................................................ 119/14.08
[58] Field of Search ........................... 119/14.01, 14.02, 119/14.03, 14.08, 14.1, 14.13

[56] References Cited

U.S. PATENT DOCUMENTS

| 3,461,844 | 8/1969 | Harrison | 119/526 |
| 3,699,926 | 10/1972 | Stockl | 119/526 |
| 3,810,442 | 5/1974 | Jacobs et al. | 119/526 |
| 5,630,379 | 5/1997 | Gerk et al. | 119/667 |

FOREIGN PATENT DOCUMENTS

| A 0194730 | 9/1986 | European Pat. Off. . | |
| A 0567191 A2 | 10/1993 | European Pat. Off. . | |
| A 0595409A1 | 5/1994 | European Pat. Off. . | |
| 1757360 | 4/1968 | Germany . | |
| 2825628 | 1/1979 | Germany | 119/526 |
| PCT/CA94/00019 | 1/1994 | WIPO . | |

OTHER PUBLICATIONS

International Search Report (PCT) for Netherlands Application 95000363 filed Feb. 24, 1995.
European Search report dated Apr. 23, 1994.

*Primary Examiner*—Thomas Price
*Attorney, Agent, or Firm*—Penrose Lucas Albright

[57] ABSTRACT

The Invention relates to a construction including an implement for milking animals, such as cows, provided with a milk box (2). In the milk box (2) the floor (15) is designed as a flexible conveyer (16), below which there is disposed a flexible floor (31) supported against a metal plate (33). The floor (31), provided with recesses (32) at the underside, is relatively flexible. In the milk box (2) there is furthermore provided a trough (14) including a mixing device, by means of which a lure substance, such as treacle, can be added to the concentrate. Moreover, the milk box (2) is provided with a medical instrumenl (36), by means of which the blood pressure, the heartbeat, the temperature, etc. of an animal in the mild box (2) can be determined. In addition, the milk box (2) is provided with a sensor, by means of which the physical state of the animal's legs can be determined.

36 Claims, 5 Drawing Sheets

APPARATUS FOR MILKING ANIMALS

RELATED APPLICATIONS

This is a continuation of International Application No. PCT/NL96/00088, filed Feb. 22, 1996, International Publication No. WO96/25846, dated Aug. 29, 1996.

FIELD OF THE INVENTION

The invention relates to an apparatus for milking animals, such as cows, provided with a milking compartment. In particular, it relates to a milking compartment that includes features which are attractive to animals milked in the milking compartment.

BACKGROUND OF THE INVENTION

Such constructions are known. Cows do not, however, always desire to enter the milking compartment without delay. Therefore, it is advantageous to provide features in the milking compartment which induce the cows to enter and to be milked without causing problems.

SUMMARY OF THE INVENTION

An object of the invention is to provide an improved construction which avoids drawbacks relating to the adaption of animals to automatic milking which limits them to a considerable extent and provides features which are attractive to, and induce the desired behavior by, the animals that are milked.

According to the invention, the apparatus provides means for encouraging the cow to enter the milking compartment, while at the same time providing the floor of the milking compartment with means that cause the cow's stay in the milking compartment to be a pleasant one and to promote the animal's milk production. In an embodiment according to the invention, the means comprise a floor including a flexible deck composed of rubber or synthetic material and further attractions for enticing the animal to enter the milking compartment. In a preferred embodiment according to the invention, the flexible deck is composed of rubber or synthetic material and is provided at its underside with recesses. The recesses in the flexible deck provide a relative elasticity so that, when an animal puts its legs on the flexible deck, a large part of the impacts that would be otherwise transmitted to the joints of the legs and hips of the animal, are absorbed by the flexible deck. Furthermore, such a flexible deck also has an insulation function so that cold is transferred less quickly to the animal's legs. For the purpose of supporting the flexible deck, according to a further inventive feature, it is preferably underpropped by a metal plate. To prevent it from moving relative to the milking compartment's floor, according to again another inventive feature the flexible deck is disposed in a frame attached to that deck.

For the purpose of preventing the animals from staying away from the milking compartment because it is contaminated by dung, mud or the like, according to an inventive feature the milking compartment comprises a deck or floor wherein at least part of its surface is movable horizontally and downwardly. Therefore, the invention also relates to an apparatus for milking animals, such as cows, provided with a milking compartment, characterized in that the milking compartment comprises a floor of which at least part of the surface is movable horizontally and downwardly. According to a inventive feature, the movable part of the floor comprises a flexible, motor drivable conveyer. In a preferred embodiment according to the invention, the conveyer extends over the entire length and width of the milking compartment. After an animal has left the milking compartment, which can be ascertained by the cow identification system or other means, according to a further inventive feature, the floor surface is moved so that the next animal to occupy the milking compartment will always be received by a clean floor. According to a further inventive feature, contaminations that might be present on the movable floor, such as dung, urine, mud, etc., are collected in a drain provided at one end of the movable floor. For the purpose of removing also contaminations that are relatively difficult to remove from the floor surface, according to a further inventive feature, near the end where the drain is situated, there is provided a scraper for removing such contaminations from the floor surface. In a preferred embodiment according to the invention, the scraper is designed as a motor drivable auger.

According to a yet further inventive feature, additional enticement means is provided that comprises a drinking trough, which, according to another inventive feature, is provided with a mixing device by means of which treacle (molasses) or other material can be added to the drinking water. According to again a further inventive feature, the enticement means comprises a fodder trough including a mixing device by means of which a substance, such as treacle, can be added to the concentrate.

To make the animal's stay in the milking compartment more pleasant, according to another inventive feature, the enticement means comprises a spraying device by means of which warm water is sprayed against the animal's legs. After the animal's legs have been cleaned by means of the spraying device, according to another inventive feature, the legs are dried with the aid of a ventilator blowing warm air against them. As it has appeared in practice, this is experienced by the animals as very pleasant and contributes to hygienic operations in the milking compartment which, in the end, has a positive influence on the quality of the milk and the health of the animals.

According to another inventive feature, on or near the milking compartment there is provided a ventilator, by means of which an air current is blown towards an animal in the milking compartment. According to yet another inventive feature, an air current is blown along the animal's back. The latter measure helps prevent flies and other vermin from approaching the animal. According to still another inventive feature, an air current is blown against the animal's udder. In particular when the air current is warm, the animal finds the experience pleasant. According to the invention, the warming up of air can be produced by a heating element.

In a preferred embodiment according to the invention, the apparatus comprises a supply channel through which there can be supplied clean, fresh air from outside the stable or cowshed in which the apparatus is located, to the ventilator. In this way, milking can take place under very hygienic conditions which ultimately may result in better milk quality. According to the invention, the vermin present on or near an animal may also be controlled by treating the animal with an insecticide and/or skin care means.

In a preferred embodiment according to the invention, the apparatus for treating the animal comprises a spraying device disposed on or near the milking compartment. According to a further inventive feature, the apparatus for treating an animal comprises registration means to record which animal has been treated with the insecticide and/or skin care means and which animal, on the basis of these data, should be treated again. In this manner selective treatment of the animals by insecticide and/or skin care means is provided. In a preferred embodiment according to the invention, an animal is treated with the insecticide and/or skin care means prior to being milked in the milking compartment. Consequently, the animal will behave in a calmer manner in the milking compartment, which, in turn, simplifies connecting teat cups to the animal's teats. The abovementioned apparatus for treating the animal with an insecticide is adapted to be applied together with the above-mentioned ventilator as well as separately. If they are applied together, it is advantageous to introduce the insecticide and/or skin care means into the air current of the ventilator by means of the above-described apparatus.

According to another inventive feature, the construction comprises one or more sensors for the purpose of determining the animal's behavior in a milking compartment. According to a still further inventive feature, the sensors are provided on the milking compartment. According to another inventive feature, the sensors include an activity meter by means of which physical characteristics such as the heat of the cow can be ascertained.

In a preferred embodiment according to the invention, the milking compartment comprises a medical instrument by means of which the heartbeat, the temperature, the blood pressure, etc. of the animal can be measured while the animal is in the milking compartment and the data supplied to a computer. With the aid of the aforementioned parameters, the physical state of each animal can be kept up to date in the computer. When a parameter measured by the medical instrument deviates from an average value inputted in the computer for the aforementioned parameters, then the farmer's attention is drawn thereto by means such as a print-out of the computer. A deviation from the above-mentioned parameters can be an indication for the farmer that an animal is ill or in heat.

According to an inventive feature, the air withdrawal, rest and beat proportions in a pulsation space of a teat holder is adapted by means of a controlled pulsator on the basis of the heartbeat frequency supplied by the medical instrument.

Therefore, the invention also relates to an apparatus for milking animals, such as cows, provided with a milking compartment, characterized in that the air withdrawal, rest and beat proportions in the pulsation space of a teat holder is regulated by means of a controlled pulsator on the basis of the heartbeat frequency supplied by the medical instrument. In this manner, the blood circulation of the teats and the possible damage of the tissue in the teats due to pulsation of the teat lining can be taken into account. In an embodiment according to the invention, the medical instrument ascertains, on the basis of the heartbeat frequency, when the blood in the teat is circulating, whereafter the controlled pulsator removes the vacuum in the pulsation space of the teat holder. In a preferred embodiment according to the invention, immediately after the medical instrument has ascertained that blood circulation in the teat is highest, the vacuum in the pulsation space of the teat holder is removed by the controlled pulsator. According to a further inventive feature, the medical instrument includes a sensor which, after an animal has entered the milking compartment, is applied against the animal's udder, so that the heartbeat frequency can be read.

According to again another inventive feature, the milking compartment comprises one or more sensors, by means of which the physical state of the animal's legs is determined. The sensor may be designed as a temperature meter, an ultrasound scan, an X-ray machine, etc. Therefore, the invention furthermore relates to a construction including an apparatus for milking animals, such as cows, provided with a milking compartment, characterized in that the apparatus comprises one or more sensors provided on the milking compartments, by means of which the physical state of the animal's legs is determined. The signals supplied by the sensors are processed in the computer and compared with a threshold value inputted beforehand. When the threshold value is exceeded, then the farmer's attention is drawn to the fact that with a specific animal there has been ascertained a defect of the legs.

According to a further inventive feature, the apparatus includes a milking robot for automatically connecting the teat cups to the teats of an animal to be milked in the milking compartment. According to again another inventive feature, the apparatus comprises a stable or cowshed including a number of cubicles provided with flexible floors.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENT

Figure 1:
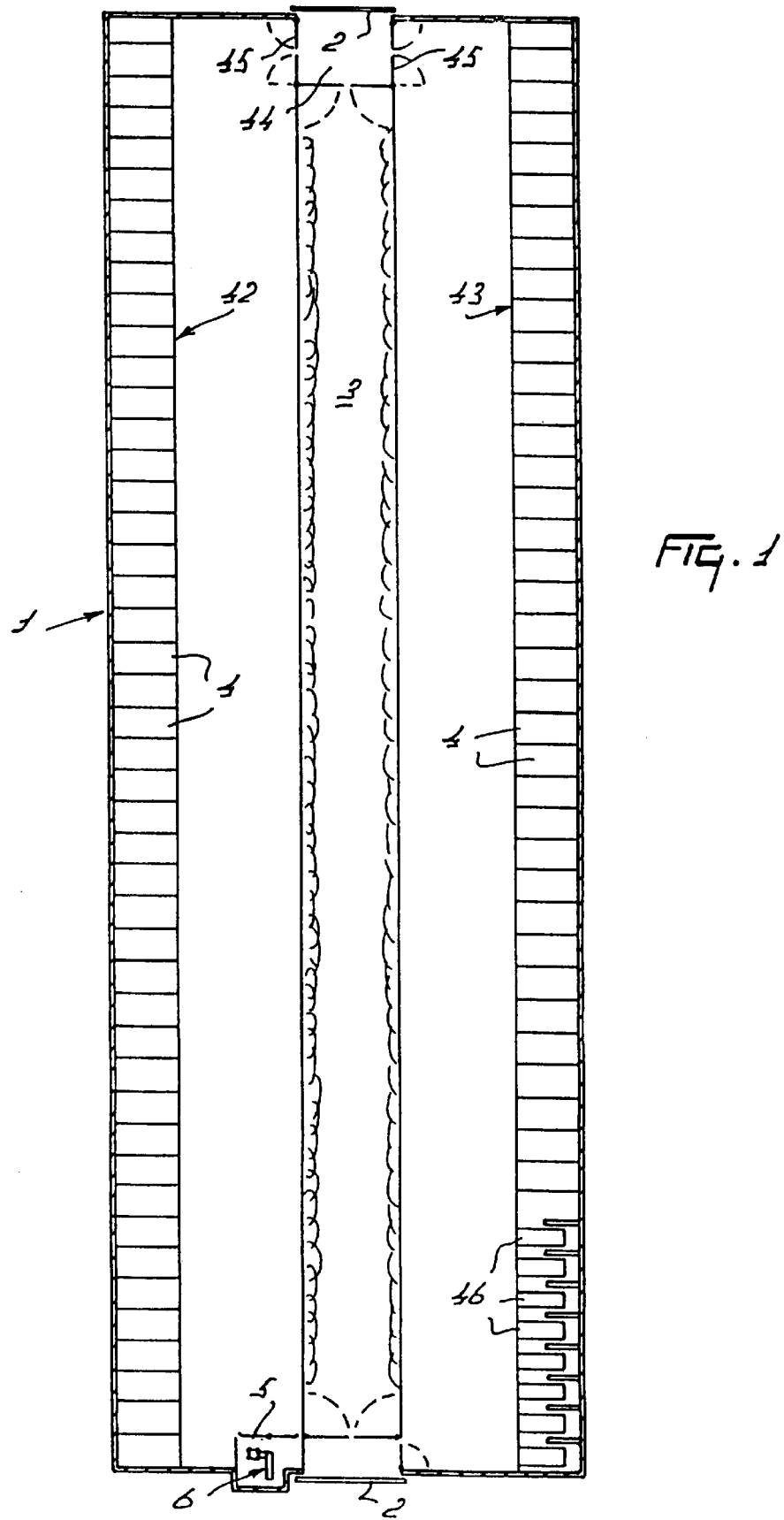
FIG. 1 shows, in plan view, a cowshed including cubicles, a milking compartment and milking robot for milking animals.

FIG. 1 shows, in plan view, a structure including an apparatus for milking animals comprising a stable or cowshed 1, entrance doors 2, a feed alley 3 and, on both sides, a row of cubicles 4. In cowshed 1, an entrance 2 is provided at one end adjacent to a milking compartment 5 in which there is schematically indicated a milking robot 6 by means of which the teat cups can be connected automatically, in a usual manner, to the teats of an animal to be milked.

Figure 2:
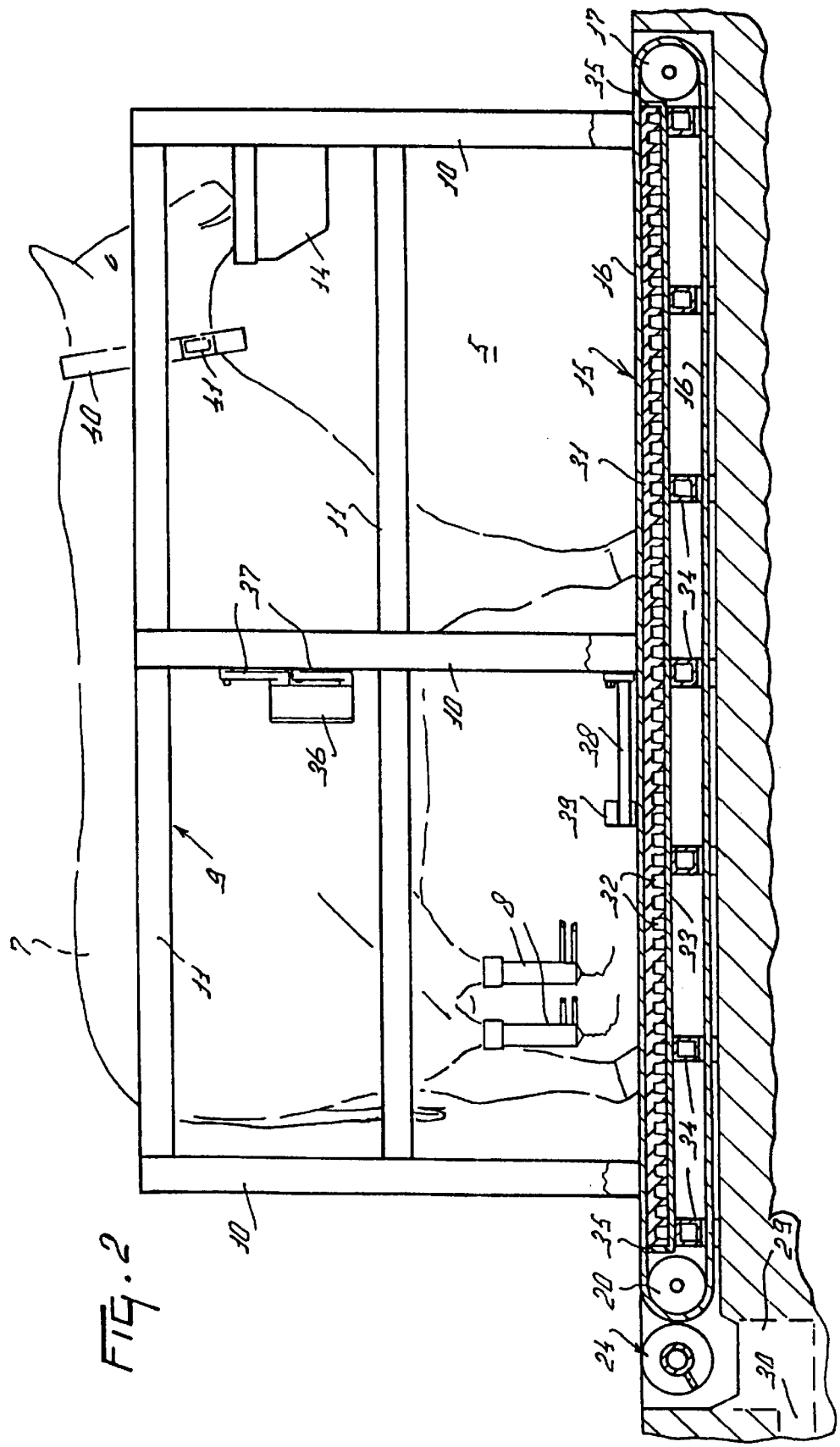
FIG. 2 shows a side elevational view in partial section of the milking compartment in FIG. 1.
Figure 3:
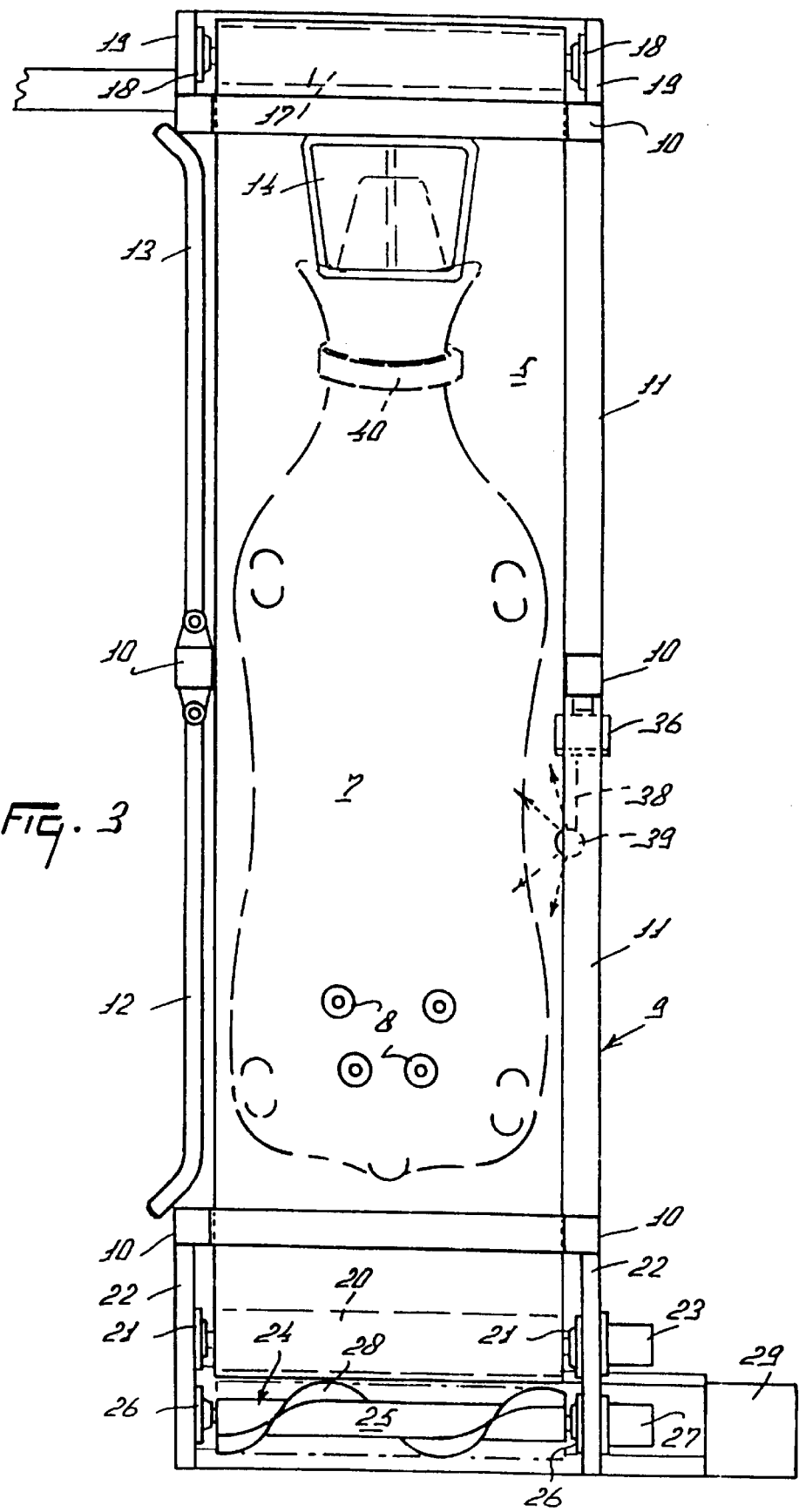
FIG. 3 shows a plan view of the milking compartment according to FIG. 2.

FIG. 2 shows, in side view, the milking compartment 5 according to FIG. 1, occupied by a cow 7, depicted in dashed lines, whose teats are connected to teat cups 8. The milking compartment 5 comprises a framework 9 including posts or stands 10 interconnected by horizontal crossbeams 11. As is shown in FIG. 3, milking compartment 5 is provided at one longitudinal side with an entrance gate or door 12 and an exit or gate or door 13. Moreover, at the front side of the milking compartment 5 is provided a trough 14 mounted on a transverse crossbeam of the framework 9, which trough can be used as a drinking or feeding trough for the animal. In addition, trough 14 is provided with a mixing device (not shown) by means of which an introduced substance, such as treacle, can be added to the fodder or the drinking water.

Furthermore, the milking compartment 5 is provided with a floor 15 comprising a conveyer 16 extending over the entire length and width of the milking container. Conveyer 16 is preferably made of a flexible material, such as synthetic material or rubber. Near the front side of the milking container, conveyer 16 is disposed about a cylindrical roller element 17, which at both ends is bearing-supported in bearings 18 provided in blocks or strips 19. The latter strips are each connected with a foremost stand 10 of framework 9 (FIG. 3). The cylindrical roller element 17, as is shown in FIGS. 2 and 3, is disposed outside milking compartment 5 and below the level of the floor surface of milking compartment 5. At the rear side of milking compartment 5, is also provided a further cylindrical roller element 20, which on both sides is bearing-supported in bearings 21 provided in bars or strips 22. The latter strips are connected with the rearmost stands 10 of framework 9. Conveyer 16 is also disposed about the rearmost roller element 20, which is motor drivable by means of an electric motor 23 provided on strip 22.

Near the rearmost roller element 20, there is furthermore provided a scraper 24 for the purpose of removing contaminating material that might be present on conveyer 16, such as dung, mud, etc. The scraper 24 comprises an auger 25, which at its two ends is rotatably bearing-supported in bearings 26 provided in strips 22. Auger 25 is motor drivable by means of an electric motor 27 provided on a strip 22. Auger 25 is arranged at such a distance from roller element 20 that the comb 28 of the auger moves closely adjacent the surface of conveyer 16. Below scraper 24, there is furthermore provided a drain 29 which, via a discharge pipe 30, is in communication with a (not shown) dung cellar.

Figure 4:
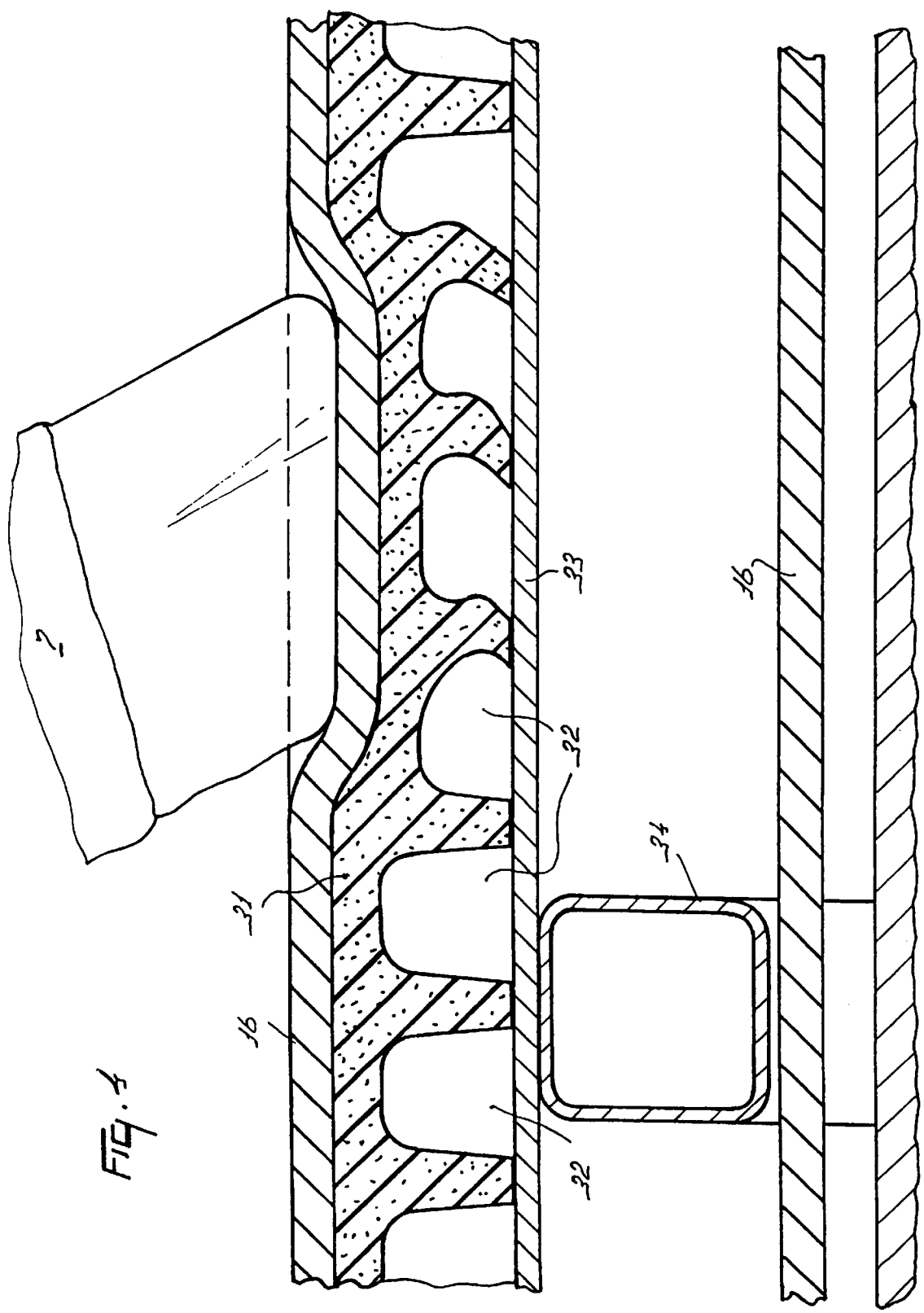
FIG. 4 is an enlarged fragmentary, cross-sectional view of the floor of the milking compartment according to FIG. 2.

In milking compartment 5, below conveyer 16, is a flexible floor 31 composed of synthetic material and provided at the underside with U-shaped recesses 32 (FIG. 4). The flexible floor may also be made of another type of material, such as rubber. Flexible floor 31 is supported against a metal plate 33 supported by box girders 34. In order to prevent flexible floor 31 from shifting relative to the metal plate 33, the latter plate is surrounded by a frame 35.

On the middle stand 10 of a longitudinal side of the milking compartment 5, is a medical instrument 36, by means of which the heartbeat, the temperature, the blood pressure, etc. of cow 7 in the milking compartment 5 can be measured and supplied to a computer. Medical instrument 36 can be pivoted against the body of the cow 7 about a vertical shaft 37 including a cylinder.

On the middle vertical stand 10, near its lower side, is a horizontal strip 38 including at its end a sensor 39 rotatable about a vertical shaft, by means of which the physical state of the animal's legs is determined. Sensor 39 may be an X-ray machine, an infrared camera, an ultrasound scan, etc. The signal from sensor 39 is processed in the computer. Moreover, the abovedescribed construction comprises an animal identification system by means of which the identity of an animal in milking compartment 5 can be determined. For that purpose each animal is provided with a collar 40 including a transponder 41. By means of the animal identification system, the data supplied by medical instrument 36 and sensor 39 and processed in the computer are kept up to date for each animal that uses milking compartment 5. Further, by means of the animal identification system it is also ascertained whether or not an animal has left milking compartment 5, whereafter the computer supplies a signal to the electric motors 23 and 27, so that conveyer 16 is placed in operation and, by means of scraper 24, materials present on the conveyer are removed. In this way, the next animal to enter the milking compartment 5 will have a clean floor.

Moreover, the milking compartment 5 may be provided with a spraying device by means of which warm water can be sprayed against the animal's legs, as well as with a ventilator by means of which, after the cleaning of the legs is finished, warm air is blown against the animal's legs.

Figure 5:
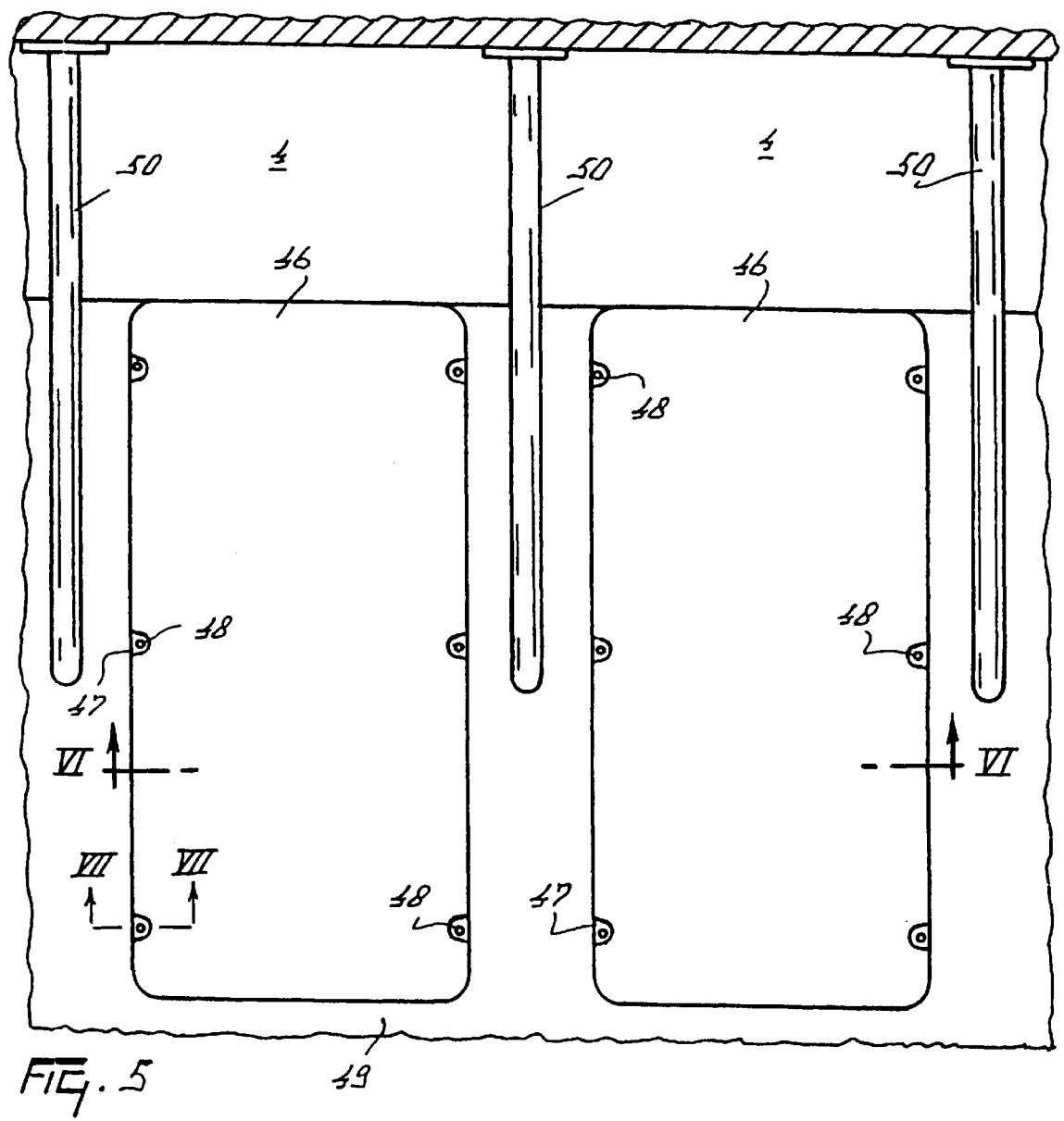
FIG. 5 is a plan view of two side-by-side cubicles according to FIG. 1, provided with flexible floors.
Figure 6:
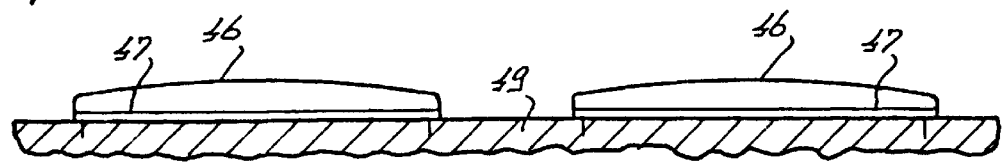
FIG. 6 shows a rear view of the flexible floors seen in the direction of the arrow VI in FIG. 5.
Figure 7:
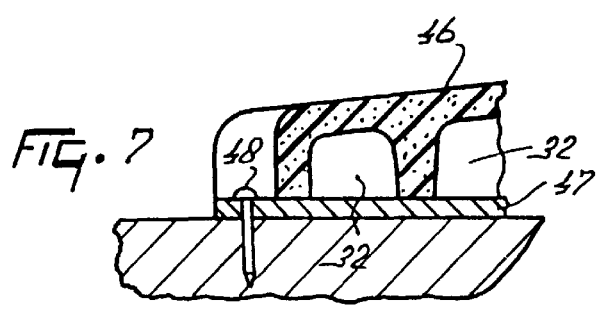
FIG. 7 is an enlarged fragmentary cross-sectional view which illustrates the fastening of the flexible floors in the cubicles taken on line VII—VII of FIG. 5.

As is shown in FIG. 1, cowshed 1 comprises cubicles 4 on both longitudinal sides. The first row of cubicles 42 is separated from the second row of cubicles 43 by a feed alley 3. At one end of the feed alley 3 there is a passage 44 connecting the first row of cubicles 42 with the second one 43. Passage 44 is provided with computer controlled doors 45. Each of the cubicles 4 includes a flexible floor 46 made of synthetic material or rubber and provided at the lower side with U-shaped recesses 32 (FIG. 7). As is shown in FIG. 6, the centers of the flexible floors 46 are higher than they are near their edges. Said flexible floors are supported against a metal plate 47 which is connected on the floor 49 of cowshed 1 by means of six wire nails 48 (FIG. 5). Furthermore, flexible floors 46 are glued to metal plate 47. In addition, between two juxtaposed cubicles 4 there is provided a U-shaped tube 50, which is attached with its end to the wall of cowshed 1 and extends approximately until halfway the length of cubicle 4.

The function of the above-mentioned construction including the apparatus for milking animals is explained in what follows:

Cowshed 1 is adapted to accommodate a group of cows and to milk same automatically by means of the milking robot 6. After having taken bulkage from the feed alley 3, the animals desire to ruminate same and then, in general, assume a horizontal position. Cubicles 4 being provided with flexible floors, constitute ideal places for the cows to retire and ruminate. Lured by the comfort of the cubicles 4, which, for lying down, is more or less comparable to that of a meadow, the animals looking for a place to lie on will rather choose cubicles 4 rather than the relatively hard and cold concrete floor 49 of cowshed 1. A further advantage is that flexible floors 46 have an insulating function so that little warmth is withdrawn from the animal's body and consequently the risk of getting stiff joints and catching a cold is reduced.

After some time, a large number of the animals in the cowshed 1, by means of a natural stimulus or habituation, will feel the need to enter the milking compartment 5 and let themselves be milked automatically by milking robot 6. After an animal has entered milking compartment 5, concentrate is provided to the animal in trough 14 by means of a concentrate dosage system. However, it has been learned in practice that, in spite of the fact that there is concentrate available to animals in milking compartment 5, many of such animals are not inclined to enter said milking compartment. For the purpose of enticing also these animals to enter milking compartment 5, there is not only supplied concentrate in trough 14, but, via a mixing device, an inviting, tasty substance is added thereto which, in the present embodiment, is treacle. Animals react very positively thereto. Animals that previously did not, or at least did not regularly, visit milking compartment 5 when they should have were attracted by the treacle and started visiting milking compartment 5 earlier and more frequently.

Before the animal is milked by milking robot 6, it is identified by an animal identification system by means of transponder 41. During milking, the heartbeat, the blood pressure and the temperature of the animal are measured by means of medical instrument 36 and compared with an average value previously inputted for each animal for the corresponding parameter. When one of the aforementioned parameters deviates too much from the average value, this is printed on an attention list to alert the farmer that he should inspect the animal or consult the veterinary. Moreover, by means of sensor 39 the physical state of the animal's legs is measured and, when the latter show a defect, this is also printed on the attention list. After milking of the animal has been completed and teat cups 8 have been disconnected, exit door 13 is opened and the animal can leave the milking compartment 5. Whether or not the animal has left the milking compartment is ascertained by the animal identification system. When the milking compartment 5 is empty, the computer supplies a signal to the electric motors 23 and 27, so that conveyer 16 and auger 25 are put into operation. Then, the surface of conveyer 16 is cleaned by auger 25 so that, when another animal occupies milking compartment 5, its floor is clean. Due to the fact that a flexible floor 31 is provided below conveyor 16, the milking compartment's floor is relatively soft. In practice the animals apparently find this a pleasant experience and are thus more inclined to enter milking compartment 5. The risk for the animals of sustaining injuries to their legs in the relatively small space of milking compartment 5 is reduced considerably as a consequence of the relatively soft floor.

The invention is not restricted to the aforementioned description, but also relates to all details of the drawings. Also, although I have described the preferred embodiment of my invention, it is capable of other adaptations and modifications within the scope of the appended claims.

Having disclosed my invention, what I claim as new and to be secured by Letters Patent of the United States is:

1. A construction including an apparatus for milking animals, such as cows, which comprises a milking compartment, means for performing the function of encouraging the cow to enter said milking compartment, said milking compartment having a floor, said floor including pliant means for performing the function of making the period of time the cow stays in said milking compartment a pleasant one, said floor being convexly curved as seen in cross-section across said milking compartment.

2. A construction in accordance with claim 1, wherein said floor is composed of a flexible material.

3. A construction in accordance with claim 2, wherein said floor is composed of a rubberlike material.

4. A construction in accordance with claim 3, wherein said rubberlike material comprises hollow spaces.

5. A construction in accordance with claim 4, wherein said hollow spaces comprise recesses disposed on the lower side of said floor.

6. A construction in accordance with claim 2, comprising a metal plate which supports said floor.

7. A construction in accordance with claim 2, wherein said milking compartment comprises a frame which is attached to said floor.

8. A construction in accordance with claim 7, wherein wire nails firmly attach said frame to said floor.

9. A construction in accordance with claim 1, wherein said means for performing the function of encouraging the cow to enter said milking compartment comprises a drinking trough.

10. A construction including an apparatus for automatically milking animals, such as cows, which comprises a milking compartment which includes a floor, said floor comprising an upper flexible part and a lower part composed of a rubberlike material, said upper flexible part being moveable horizontally and downwardly relative to said lower part.

11. A construction in accordance with claim 10, comprising a motor operatively connected to move said upper flexible part relative to said lower part, said upper flexible part, said lower part and said motor being constructed and arranged so that said upper flexible part comprises a motor drivable flexible conveyor that is disposed to move above said lower part.

12. A construction in accordance with claim 11, wherein said conveyor extends over the entire length and width of said milking compartment.

13. A construction in accordance with claim 11, comprising means for performing the function of actuating said motor to move said upper flexible part relative to said lower part as soon as an animal has departed from said milking compartment.

14. A construction in accordance with claim 13, comprising an animal identification system associated with said milking compartment, said animal identification system including means which ascertains the presence or absence of an animal on said floor.

15. A construction in accordance with claim 10, comprising a drain means disposed at one end of said upper flexible part which serves the purpose of collecting and draining contaminants, including dung and urine that an animal deposits on said upper flexible part.

16. A construction in accordance with claim 15, comprising a scraper means, said drain means being associated with said scraper means for performing the function of removing contaminants from said upper flexible part.

17. A construction in accordance with claim 16, wherein said scraper means comprises a motor drivable auger.

18. A construction in accordance with claim 10, comprising animal enticement means for enticing animals to enter said milking compartment, said animal enticement means comprising a drinking trough.

19. A construction in accordance with claim 18, comprising a mixing device associated with said drinking trough for adding an attractive substance to water received in said drinking trough.

20. A construction in accordance with claim 10, comprising enticement means for attracting an animal to enter said milking compartment, said enticement means comprising a fodder trough which includes a mixing device for adding a substance attractive to the animal to fodder received by said fodder trough.

21. A construction in accordance with claim 10, comprising enticement means for performing the function of enticing an animal to enter said milking compartment, said enticement means comprising a spraying device that sprays warm water against the legs of an animal that has entered into said milking compartment.

22. A construction in accordance with claim 10, comprising enticement means for attracting an animal to enter said milking compartment, said enticement means comprising a ventilator that blows warm air against the legs of an animal which has entered said milking compartment.

23. A construction in accordance with claim 10, comprising sensor means for monitoring an animal in said milking compartment.

24. A construction in accordance with claim 23, wherein said sensor means is mounted on said milking compartment.

25. A construction in accordance with claim 24, wherein said sensor means comprises an animal activity meter.

26. A construction in accordance with claim 24, wherein said sensor means comprises means for determining the temperature of an animal in said milking compartment.

27. A construction in accordance with claim 24, wherein said sensor means comprises a medical instrument which is adapted to be movable to an animal in said milking compartment, said medical instrument including means for determining the heartbeat, the temperature and the blood pressure of an animal in said milking compartment, the construction further comprising a computer that receives and records data from said medical instrument.

28. A construction in accordance with claim 24, wherein said sensor means comprises means for determining the physical state of the legs of an animal in said milking compartment.

29. A construction in accordance with claim 10, comprising a milking robot for automatically connecting teat cups to the teats of an animal to be milked in said milking compartment.

30. A construction in accordance with claim 10, comprising a cow shed including a plurality of cubicles, each said cubicle comprising a flexible floor.

31. An apparatus for milking animals, such as cows, which comprises a milking compartment, a milking robot for automatically milking animals in said milking compartment, and enticement means for attracting animals to enter said milking compartment, said enticement means consisting of at least two of the following:

a flexible floor in said milking compartment;

a drinking trough in said milking compartment;

spray means for spraying the legs of an animal in said milking compartment with warm water; and an air blower for blowing warm air against the legs of an animal in said milking compartment.

32. An apparatus for milking animals, such as cows, which comprises a milking compartment, a milking robot for automatically milking animals in said milking compartment, and enticement means for attracting animals to enter said milking compartment, said enticement means comprising spray means for spraying the legs of an animal in said milking compartment with warm water and a flexible floor in said milking compartment which is curved in a convex manner as seen in cross-section across said milking compartment.

33. An apparatus for milking animals, such as cows, which comprises a milking compartment, a milking robot for automatically milking animals in said milking compartment, and enticement means for attracting animals to enter said milking compartment, said enticement means comprising a drinking trough and a flexible floor in said milking compartment, said flexible floor being curved in a convex manner as seen in cross-section across said milking compartment.

34. An apparatus for milking animals, such as cows, which comprises a milking compartment, a milking robot for automatically milking animals in said milking compartment, and enticement means for attracting animals to enter said milking compartment, said enticement means comprising a drinking trough in said milking compartment and a flexible floor in said milking compartment.

35. An apparatus for milking animals, such as cows, which comprises a milking compartment, a milking robot for automatically milking animals in said milking compartment, and enticement means for attracting animals to enter said milking compartment, said enticement means comprising spray means for spraying the legs of an animal in said milking compartment with warm water, an air blower for blowing warm air against the legs of an animal in said milking compartment, and a flexible floor in said milking compartment which is curved in a convex manner as seen in cross-section across said milking compartment.

36. A construction including an apparatus for milking animals, such as cows, which comprises a milking compartment, means for performing the function of encouraging the cow to enter said milking compartment, said milking compartment having a floor, said floor including pliant means for performing the function of making the period of time the animal stays in said milking compartment a pleasant one, said floor comprising an upper part composed of flexible material and a lower part comprised of a rubberlike material, said upper part being movable horizontally and downwardly relative to said lower part.

* * * * *